United States Patent
Moser et al.

(10) Patent No.: US 10,046,481 B2
(45) Date of Patent: Aug. 14, 2018

(54) COMPONENT FEED NOZZLE

(71) Applicant: KraussMaffei Technologies GmbH, München (DE)

(72) Inventors: Ralf Moser, Munich (DE); Josef Renkl, Markt Indersdorf (DE)

(73) Assignee: KRAUSSMAFFEI TECHNOLGIES GMBH, München (DE)

( * ) Notice: Subject to any disclaimer, the term of this patent is extended or adjusted under 35 U.S.C. 154(b) by 0 days.

(21) Appl. No.: 14/412,956

(22) PCT Filed: Jun. 28, 2013

(86) PCT No.: PCT/EP2013/063581
§ 371 (c)(1),
(2) Date: Jan. 5, 2015

(87) PCT Pub. No.: WO2014/009172
PCT Pub. Date: Jan. 16, 2014

(65) Prior Publication Data
US 2015/0190945 A1   Jul. 9, 2015

(30) Foreign Application Priority Data

Jul. 11, 2012 (DE) .......... 10 2012 106 230

(51) Int. Cl.
*B29B 7/76* (2006.01)
*B29B 7/80* (2006.01)
(Continued)

(52) U.S. Cl.
CPC .......... *B29B 7/7642* (2013.01); *B29B 7/7615* (2013.01); *B29B 7/801* (2013.01); *F16K 31/126* (2013.01); *F16K 41/103* (2013.01)

(58) Field of Classification Search
CPC ..... B29B 7/7615; B29B 7/801; B29B 7/7642; F16K 41/103; F16K 31/126
(Continued)

(56) References Cited

U.S. PATENT DOCUMENTS 2,308,183 A * 1/1943 Lewis ............... F16K 41/10
251/335.3
2,699,801 A * 1/1955 Schleyer ........... F16K 41/12
116/277
(Continued)

FOREIGN PATENT DOCUMENTS

CN    1990253 A      7/2007
CN    200946756 Y   9/2007
(Continued)

OTHER PUBLICATIONS

International Search Report issued by the European Patent Office in International Application PCT/EP2013/063581 dated Sep. 2, 2013.
(Continued)

*Primary Examiner* — Steven J Ganey
*Assistant Examiner* — Steven M Cernoch
(74) *Attorney, Agent, or Firm* — Henry M. Feiereisen LLC

(57) ABSTRACT

A component feed nozzle includes a housing, which has a component inlet and a component outlet, a piston-shaped closing body, which is slidably supported in the housing and which can be moved back and forth axially. The component outlet is closed by the front end of the closing body in a first position and the component outlet is released or opened in a second position. The component feed nozzle has a membrane seal, which is fastened to the rear end of the closing body and to the housing in such a way that the closing body is completely on one face of the membrane seal. The housing and/or the closing body are designed in such a way that the (Continued)

component reaches all surfaces of the closing body and thus the component pressure is applied to the complete effective surface of the membrane.

11 Claims, 1 Drawing Sheet

(51) Int. Cl.
*F16K 31/12* (2006.01)
*F16K 41/10* (2006.01)
*F16K 31/126* (2006.01)

(58) Field of Classification Search
USPC ....... 239/584, 91, 92, 583; 137/494, 505.36, 137/510, 199, 204
See application file for complete search history.

(56) References Cited

U.S. PATENT DOCUMENTS

| | | | | |
|---|---|---|---|---|
| 2,700,303 A | * | 1/1955 | Galliers | G01L 1/02 137/199 |
| 3,084,901 A | | 4/1963 | Thorburn | |
| 4,813,446 A | * | 3/1989 | Silverwater | F15B 21/044 137/198 |
| 5,211,200 A | * | 5/1993 | Cassidy | F15B 21/044 137/183 |
| 5,687,952 A | * | 11/1997 | Arnold | E03C 1/0404 137/801 |
| 6,305,665 B1 | * | 10/2001 | Coura | F16K 41/103 251/319 |
| 6,311,950 B1 | * | 11/2001 | Kappel | F02M 51/0603 251/129.06 |
| 6,634,569 B2 | * | 10/2003 | Boecking | F02M 55/002 239/88 |
| 7,461,829 B2 | * | 12/2008 | Rule | F16J 3/041 251/318 |
| 7,661,437 B2 | * | 2/2010 | Schulz | F16K 41/103 137/312 |
| 2006/0065868 A1 | * | 3/2006 | Strong | F16K 31/1221 251/63.5 |
| 2006/0118753 A1 | | 6/2006 | Rule | |
| 2006/0273206 A1 | * | 12/2006 | Schulz | F16K 41/103 239/533.1 |
| 2013/0168592 A1 | * | 7/2013 | Yan | F16K 41/103 251/331 |

FOREIGN PATENT DOCUMENTS

| | | |
|---|---|---|
| DE | 10632 | 10/1955 |
| DE | 1 926 781 | 11/1970 |
| DE | 2 360 154 | 6/1974 |
| DE | 83 28 350 | 12/1983 |
| DE | 100 20 157 | 11/2001 |
| DE | 102007037780 | 2/2009 |
| GB | 2 136 539 | 9/1984 |
| WO | WO 2012/088666 | 7/2012 |

OTHER PUBLICATIONS

Chinese Search Report dated Feb. 19, 2016 with respect to counterpart Chinese patent application 201380036590.7.
English Copy of Chinese Search Report dated Nov. 21, 2016 with respect to counterpart Chinese patent application 201380036590.7.

* cited by examiner

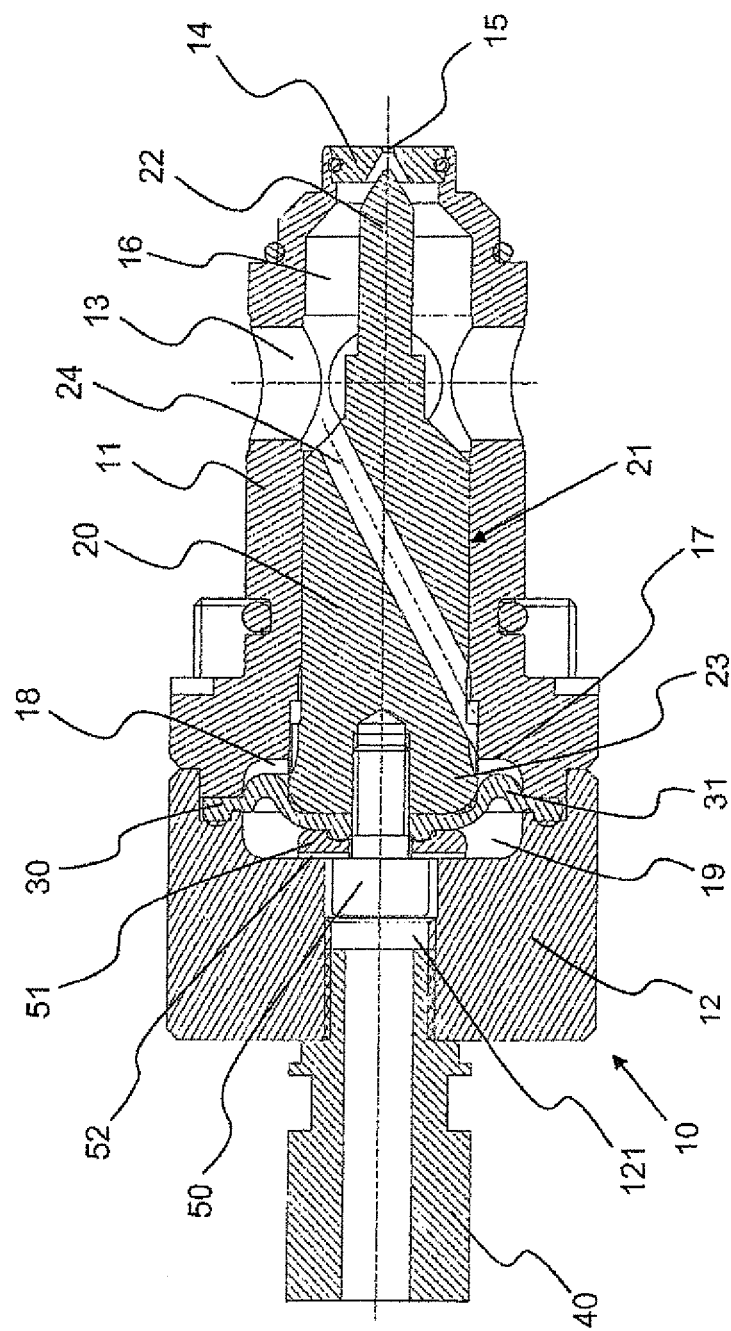

COMPONENT FEED NOZZLE

CROSS-REFERENCES TO RELATED APPLICATIONS

This application is the U.S. National Stage of International Application No. PCT/EP2013/063581, filed Jun. 28, 2013, which designated the United States and has been published as International Publication No. WO 2014/009172 and which claims the priority of German Patent Application, Serial No. 10 2012 106 230.7, filed Jul. 11, 2012, pursuant to 35 U.S.C. 119(a)-(d).

BACKGROUND OF THE INVENTION

The invention relates to a component feed nozzle.

Such a component feed nozzle is known for example from DE 10 2007 037 780 A1 and has a housing, in which a closing body, often designated as nozzle needle, is mounted movably between at least two positions. A component inlet and a component outlet are formed in the housing, wherein the closing body closes the component outlet when it is situated in a particular position. In order to realize a quantity adjustment in such component feed nozzles, the closing body is generally prestressed in the closing direction. The component outlet is accordingly closed when no component is fed. If, however, a component is fed and a sufficiently high pressure builds up in the component feed nozzle, the closing body then moves from the closing position and releases the component outlet.

SUMMARY OF THE INVENTION

The object of the invention is to create an improved component feed nozzle which can react more precisely to changes in component quantity.

This problem is solved by a component feed nozzle having a housing, which has a component inlet and a component outlet, a piston-shaped closing body, which is mounted in the housing so as to be movable back and forth axially between two positions, wherein the component outlet is closed by the front end of the closing body in a first position and the component outlet is released or opened in a second position, wherein a membrane seal is fastened to the rear end of the closing body and to the housing in such a way that the closing body is completely on one face of the membrane seal, wherein the housing and/or the closing body are designed in such a way that the component can reach the membrane and thus the component pressure can be applied to the complete effective surface of the membrane. Advantageous further developments are the subject matter of the dependent claims.

According to the invention, the component feed nozzle has a membrane seal which is fastened to the rear end of the closing body and to the housing in such a way that the closing body is completely on one face of the membrane seal, wherein the housing and/or the closing body are designed in such a way that the component can reach the membrane seal. An embodiment is possible here, in which the component can reach all exposed surfaces, in particular the circumferential surfaces of the closing body. In other words, the bearing of the closing body can take place in a floating manner and in the manner of a sliding bearing. In addition to the membrane seal no further seal is provided here on the closing body, so that with a movement of the closing body as little friction as possible occurs.

In an advantageous embodiment, the closing body has a guide section which is slidably supported in the housing. A radial movement of the closing body is therefore limited by the housing, wherein the guide section can come partially in contact with the housing. The closing body has, furthermore, a closing section on the component outlet side, which constitutes with the housing a component chamber, an effective section formed at the rear end of the closing body, which effective section constitutes with the housing and the membrane seal an effective chamber, wherein the component chamber and the effective chamber are fluidically connected. Therefore, the component, and especially the component pressure, can reach the surfaces of the closing body as simply as possible.

It is particularly advantageous if the closing body has at least one axial groove in the region of the guide section, which groove connects the component chamber with the effective chamber, or the closing body has at least one bore which connects the component chamber with the effective chamber. Therefore, a pressure equalization between the component chamber and the effective chamber can take place efficiently.

It is desirable if the face of the membrane seal opposed to the effective chamber constitutes a pressure chamber with the housing, and a fluid duct, opening into the pressure chamber, is formed in the housing. A pressurized fluid, for example nitrogen, can be fed to the pressure chamber through the fluid duct. A pressure balance then prevails at the membrane between the component pressure and the fluid pressure in the pressure chamber whereby, independently of the discharge performance or respectively delivery rate of the component, always the same or at least similar component pressure occurs to that in the pressure chamber.

A throttle can be provided in the fluid duct. This makes provision that the fluid in the pressure chamber can only flow from the pressure chamber at a limited speed. The throttle therefore acts as a damping element which can prevent a vibration of the closing body.

Furthermore, a pressure reservoir can be connected to the fluid duct, in order to make available a sufficient quantity of pressurized fluid. It is also possible to arrange a hydraulic piston, connected in series with the pressure chamber, or a further membrane which is able to be acted upon by pressure via a hydraulic system, in order to also realize the component outlet against the prevailing component pressure. Thereby, an enforced closing of the component outlet is possible.

A spring element can also be provided on the face of the membrane seal facing away from the effective chamber, which applies a force onto the membrane seal. Such a spring element can be arranged additionally or respectively supportingly in the preceding pressure chamber. Alternatively, the spring element can be arranged as a substitute for the pressure chamber, so that only the spring element applies the force necessary for a balance of forces on the membrane in the closing direction of the closing body.

The membrane seal can be a crimped membrane or a rolled membrane. The membrane seal is fastened to the rear end of the closing body such that its curved section projects in the direction of the component outlet. With the use of a crimped membrane or a rolled membrane, an annular recess can be provided in the housing, into which the curved section of the membrane seal projects, wherein the recess is configured such that the curved section lies against the surface of the recess extending in radial direction, when the membrane is only acted upon by pressure on the face of the pressure chamber. This has the advantage that the membrane seal is supported when a high pressure prevails in the pressure chamber. The functional capability of the membrane seal is thereby guaranteed to a higher extent, because through the support, a tearing of the membrane seal is prevented.

The membrane seal can be fastened to the closing body via a pressure plate. This pressure plate fixes the membrane to the rear end of the closing body and can have grooves, running radially, on its face facing away from the membrane. A screw can be used, for example, for fastening the membrane to the closing body. The provision of grooves in the pressure plate is important particularly if the pressure plate is used as a stop element at the same time, i.e. delimits the movement of the closing body by contact with the housing, and this covers the fluid duct at the same time. Through the grooves, a fluid feed from the fluid duct is then nevertheless possible.

The diameter of the effective section can be greater than the diameter of the guide section, and the housing can have a recess in which the effective section is received in the housing. In other words, the inner wall of the housing can be constructed in a step-like manner following the shape of the closing body.

The housing can have a first housing element and a second housing element, wherein the first housing element can have the component inlet and the component outlet and can receive the closing body in itself, and the second housing element can close an opening of the first housing element lying opposite the component outlet, wherein the membrane seal can be held, in particular clamped, between the first and the second housing element.

BRIEF DESCRIPTION OF THE DRAWING

Further features and advantages of the invention will emerge from the following example embodiment, which is described with reference to FIG. 1, which shows a longitudinal sectional view of a component feed nozzle according to the invention.

BRIEF DESCRIPTION OF PREFERRED EMBODIMENTS

The component feed nozzle 10 shown in FIG. 1 has a multipart housing which has a first housing element 11, also designated as a cartridge, and a second housing element 12, which can also be designated as a cover. The first housing element 11 is constructed in a tubelike manner and is received at its rear end partially in the second housing element 11. The housing is usually inserted with the first housing element 11 into the head piece of a mixing head and is supplied with the component through an inlet bore.

A closing body, which in the present example embodiment is realized as a nozzle needle 20, is received in an axially displaceable manner in the housing or respectively the first housing element 11 and the second housing element 12. Here, the nozzle needle 20 has a guide section 21, on which the nozzle needle 20 is mounted directly on the first housing element 11. For this purpose, the first housing element 11 is constructed so as to be hollow-cylindrical, wherein the internal diameter of the first housing element 11 at the bearing site is greater than the external diameter of the guide section 21 of the nozzle needle 20. The nozzle needle 20 is therefore mounted with a certain play in the first housing element 11, which is selected so that a friction-free mobility exists with, at the same time, sufficient guidance of the nozzle needle 20. The bearing of the nozzle needle is therefore realized as a sliding bearing. However, the bearing of the nozzle needle is not configured in a sealing manner.

At the front end of the first housing element 11 a nozzle 14 is provided, in which a component outlet 15 is formed. The component outlet 15 can be closed, released or partially released by the nozzle needle 20 or respectively the front end thereof. Furthermore, in the first housing element 11 a component inlet 13 is provided, via which a reactive component can be introduced into the component feed nozzle. When the nozzle needle 20 is in the position in which the component outlet 15 is released or respectively opened, the component outlet 15 is then connected with the component inlet 13 and the reactive component can flow out from the component outlet 15. Between the front section 22 of the nozzle needle 20 and the first housing element 11 a component chamber 16 is formed, through which the component can flow from the component inlet 13 to the component outlet 15.

The rear end of the nozzle needle 20 has a greater diameter than the other sections of the nozzle needle 20 and can also be designated as effective section 23. This effective section 23, in connection with a membrane seal 30 fastened to the rear end of the nozzle needle 20 and with the first housing element 11, constitutes an effective chamber 17. In accordance with the configuration of the rear section of the nozzle needle 20, the internal diameter of the first housing element 11 is constructed somewhat larger in the region of the effective section 17 than the external diameter of the effective section 23. The transition from the enlarged diameter to the diameter in which a sliding bearing or respectively guiding of the nozzle needle 20 takes place, is stepped. However, the effective section does not necessarily have to have a larger diameter than the guide diameter of the needle.

The fastening of the membrane seal 30 is realized in the present case by a screwed connection. The nozzle needle 20 is therefore situated completely on one face of the membrane seal 30. In the example embodiment, the membrane seal 30 is a crimped membrane, which is clamped between the first housing element 11 and the second housing element 12. The membrane seal 30 therefore divides the housing into a component side and a counterpressure side. In the first housing element 11 in addition a recess 18 is formed, into which the curvature 31 of the crimped membrane projects. With a movement of the closing body in the closing direction, the crimped membrane, in the region of this curvature, comes in contact with a radially extending surface of the recess. Thereby, the crimped membrane is supported and can withstand high pressures. Especially in the case of a one-sided application of pressure, the membrane is thus supported from the rear.

Furthermore, in the second housing element 12 a fluid duct 121 is formed, which opens into a pressure chamber 19 constituted by the membrane seal 30 and the second housing element 12. In this example embodiment, an arrangement is shown in which the fluid duct 121 has a thread into which the end of a fluid connection 40 is screwed. In this fluid connection 40, in the example embodiment, a throttle is provided. The fluid connection 40 can be connected with a hydraulic system or pneumatic system, so that a pressurized fluid can be fed to the pressure chamber 19. In order to configure the component feed nozzle so as to be as compact as possible, in the present example embodiment the fluid duct 121 and the screw 50 for fastening the membrane seal 30 on the nozzle needle are arranged on an axis and the diameter of the fluid duct 121, at least one the side facing the pressure chamber 19, is configured to be greater than the diameter of the screw head. Therefore, the screw head can dip into the fluid duct 121, whereby the length of the component feed nozzle can be reduced. For an optimal function, furthermore, a pressure plate 51 is provided between screw 50 and membrane seal 30. This pressure plate 51 comes in contact with the second housing element 12 when the nozzle needle 20 reaches a position in which the component outlet 15 is opened to a maximum extent. In order to guarantee as good a feed of fluid as possible into the pressure chamber 19, grooves running radially from the interior outwards are formed in the pressure plate 51 on the side facing away from the membrane seal 30.

In order to achieve as good a distribution as possible of the component on the component side of the membrane seal 30, a bore 24 is provided in the nozzle needle 20 which connects the effective chamber 18 with the component chamber 16. Alternatively, however, the bore can also be omitted and instead at least one groove can be provided in the nozzle needle, which connects the component chamber 16 with the effective chamber 18.

A component feed nozzle with improved response behaviour is therefore created, which also reacts extremely precisely to small changes in pressure.

What is claimed is:

1. A component feed nozzle, comprising;
   a housing having a first housing element and a second housing element axially spaced from the first housing element and having a component inlet and a component outlet provided in the first housing element and axially spaced from each other;
   a pressure plate arranged in contact with the second housing element;
   a piston-shaped closing body having a guide section slidably supported in the first housing portion of the housing for back and forth sliding movement of the closing body axially between two positions so that a bearing of the guide section of the closing body is a sliding bearing which slidingly guides the guide section during the back and forth sliding movement of the closing body axially between the two positions, said closing body having a rear end located axially further from the component outlet and a front end provided with a closing section extending from the guide section axially forwardly toward the component outlet and closing the component outlet in a first one of the two positions and clearing or opening the component outlet in a second one of the two positions; and
   a membrane seal fastened to the rear end of the closing body and to the housing such that the closing body is situated completely on a front face of the membrane seal, said membrane seal having a radially inner portion which is located between the pressure plate and the closing body and is applied at one axial side on the pressure plate and on the other side on an end face of the rear end of the closing body and also on an outer surface of the rear end of the closing body in direct contact with the end face and the outer surface of the rear end of the closing body at an axial location, said membrane seal also having a radially outer portion which is clamped between the first and second housing elements of the housing, said membrane seal (30) further having a radially intermediate portion located between the radially inner portion and radially outer portion and being free from contacts with any parts of the component feed nozzle;
   wherein at least one member selected from the group consisting of the housing and the closing body is configured to enable a component to reach the membrane seal and thereby apply a component pressure across an entire effective surface area of the membrane seal.

2. The component feed nozzle of claim 1, wherein the closing body has an effective section formed at the rear end of the closing body and defining with the housing and the membrane seal an effective chamber, with a component chamber and the effective chamber being fluidly connected.

3. The component feed nozzle of claim 2, wherein the guide section is constructed in the absence of a seal.

4. The component feed nozzle of claim 2, wherein the closing body has in a region of the guide section at least one axial groove to connect the component chamber with the effective chamber.

5. The component feed nozzle of claim 2, wherein the closing body has at least one bore to connect the component chamber with the effective chamber.

6. The component feed nozzle of claim 1, wherein the membrane seal has a face in opposition to the effective chamber to define with the housing a pressure chamber, said housing having a fluid duct feeding into the pressure chamber.

7. The component feed nozzle of claim 6, further comprising a throttle provided in the fluid duct.

8. The component feed nozzle of claim 1, wherein the membrane seal is a crimped membrane or a rolled membrane.

9. The component feed nozzle of claim 8, wherein the membrane seal has a curved section configured to project into an annular recess of the housing and to rest against a radially extending surface of the recess.

10. The component feed nozzle of claim 1, wherein the housing has a first housing element configured to accommodate the component inlet and the component outlet and to receive the closing body, and a second housing element configured to close an opening of the first housing element in opposition to the component outlet, said membrane seal being held between the first and the second housing element.

11. The component feed nozzle of claim 1, wherein the closing section of the closing body has an axial end portion insertable into the component outlet of the housing and thereby closing the component housing.

* * * * *